United States Patent
LaMarca et al.

(10) Patent No.: US 6,582,474 B2
(45) Date of Patent: Jun. 24, 2003

(54) TAGGING RELATED FILES IN A DOCUMENT MANAGEMENT SYSTEM

(75) Inventors: Anthony G. LaMarca, Redwood City, CA (US); James P. Dourish, San Francisco, CA (US); Warren K. Edwards, San Francisco, CA (US); Michael P. Salisbury, Mountain View, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/896,514

(22) Filed: Jun. 29, 2001

(65) Prior Publication Data

US 2001/0039553 A1 Nov. 8, 2001

Related U.S. Application Data

(62) Division of application No. 09/144,032, filed on Aug. 31, 1998, now Pat. No. 6,266,682.

(51) Int. Cl.[7] .................................................. G06F 17/00
(52) U.S. Cl. .......................................... 715/500; 707/1
(58) Field of Search ........................ 707/1, 3, 5, 501.1, 707/513, 516, 500; 709/203, 328, 310; 345/760; 715/513, 516, 201.1, 500

(56) References Cited

U.S. PATENT DOCUMENTS

| | | |
|---|---|---|
| 4,823,303 A | 4/1989 | Terasawa |
| 4,959,769 A | 9/1990 | Cooper et al. |
| 4,993,880 A | 2/1991 | Collins |
| 5,089,956 A | 2/1992 | MacPhail |
| 5,132,900 A | 7/1992 | Gilchrist et al. |
| 5,140,676 A | 8/1992 | Langelaan |
| 5,274,757 A | 12/1993 | Miyoshi et al. |
| 5,339,392 A | 8/1994 | Risberg et al. |
| 5,357,631 A | 10/1994 | Howell et al. |
| 5,404,435 A | 4/1995 | Rosenbaum |

(List continued on next page.)

FOREIGN PATENT DOCUMENTS

| | | |
|---|---|---|
| CA | 2 192 237 A | 5/1997 |
| EP | 185904 A1 | 7/1986 |
| WO | WO 91 14222 A | 9/1991 |
| WO | WO 97 15018 A | 4/1997 |

OTHER PUBLICATIONS

Pastore, R. "The Virtue of Virtual Documents", CIO Magazine, Apr. 1995.
Rosenblatt, B. "Documentum: Flagship of Enterprise Document Management", dated Nov. 1995, downloaded from http://www.sunworld.com/sunworldonline/swol-11-1995/swol-11-cs_p.html on Feb. 2, 2001.

(List continued on next page.)

Primary Examiner—Joseph H. Feild
(74) Attorney, Agent, or Firm—Fay, Sharpe, Fagan, Minnich & McKee, LLP (57) ABSTRACT

A document management system is provided which organizes, stores and retrieves documents according to properties attached to the documents. Applications which function based on hierarchical path names communicate to the document management system through a translator. A tag is inserted into the path of a document to identify the document and represent a dynamic collection. The same tag is inserted into the path of files which support the document so that the supporting files are related to the document by the path tag. In this manner, the document management system identifies and locates all documents which are related to each other based on the tag. Thus, an application is provided with all related files even though the application may not know where the files are actually stored or retrieved from.

13 Claims, 4 Drawing Sheets

U.S. PATENT DOCUMENTS

| | | | |
|---|---|---|---|
| 5,445,945 A | 8/1995 | Drechsler | |
| 5,473,691 A | 12/1995 | Menezes et al. | |
| 5,499,330 A | 3/1996 | Lucas et al. | |
| 5,517,655 A | 5/1996 | Collins et al. | |
| 5,528,739 A | 6/1996 | Lucas et al. | |
| 5,544,051 A | 8/1996 | Senn et al. | |
| 5,546,534 A | 8/1996 | Malcolm | |
| 5,584,023 A | 12/1996 | Hsu | |
| 5,600,833 A | 2/1997 | Senn et al. | |
| 5,613,134 A | 3/1997 | Lucus et al. | |
| 5,621,874 A | 4/1997 | Lucas et al. | |
| 5,634,062 A | 5/1997 | Shimizu et al. | |
| 5,649,192 A | 7/1997 | Stucky | |
| 5,659,676 A | 8/1997 | Redpath | |
| 5,664,109 A | 9/1997 | Johnson et al. | |
| 5,664,180 A | 9/1997 | Halpert et al. | |
| 5,694,594 A * | 12/1997 | Chang | 707/6 |
| 5,708,780 A | 1/1998 | Levergood et al. | |
| 5,713,032 A | 1/1998 | Spencer | |
| 5,715,441 A | 2/1998 | Atkinson et al. | |
| 5,727,195 A | 3/1998 | Nakatsuyama | |
| 5,729,733 A | 3/1998 | Sharif-Askary | |
| 5,740,455 A | 4/1998 | Pavley et al. | |
| 5,752,055 A | 5/1998 | Redpath et al. | |
| 5,754,782 A | 5/1998 | Masada | |
| 5,758,154 A | 5/1998 | Qureshi | |
| 5,761,684 A | 6/1998 | Gibson | |
| 5,765,176 A | 6/1998 | Bloomberg | |
| 5,802,365 A | 9/1998 | Kathail et al. | |
| 5,805,889 A | 9/1998 | Van De Vanter | |
| 5,806,068 A | 9/1998 | Shaw et al. | |
| 5,809,317 A | 9/1998 | Kogan et al. | |
| 5,812,773 A | 9/1998 | Norin | |
| 5,812,862 A | 9/1998 | Smith et al. | |
| 5,812,995 A | 9/1998 | Sasaki et al. | |
| 5,835,758 A | 11/1998 | Nochur et al. | |
| 5,835,922 A * | 11/1998 | Shima et al. | 707/522 |
| 5,845,067 A | 12/1998 | Porter et al. | |
| 5,860,073 A | 1/1999 | Ferrel et al. | |
| 5,864,850 A | 1/1999 | Nordman | |
| 5,872,974 A | 2/1999 | Mezick | |
| 5,887,133 A | 3/1999 | Brown et al. | |
| 5,890,171 A * | 3/1999 | Blumer et al. | 707/501 |
| 5,890,176 A | 3/1999 | Kish et al. | |
| 5,892,909 A | 4/1999 | Grasso et al. | |
| 5,893,908 A | 4/1999 | Cullen et al. | |
| 5,895,477 A | 4/1999 | Orr et al. | |
| 5,903,902 A | 5/1999 | Orr et al. | |
| 5,905,992 A | 5/1999 | Lucas et al. | |
| 5,913,032 A | 6/1999 | Schwartz et al. | |
| 5,930,801 A | 7/1999 | Falkenhainer et al. | |
| 5,933,811 A | 8/1999 | Angles et al. | |
| 5,933,841 A | 8/1999 | Schumacher et al. | |
| 5,940,830 A | 8/1999 | Ochitani | |
| 5,950,215 A | 9/1999 | Tabuchi | |
| 5,951,300 A | 9/1999 | Brown | |
| 5,956,737 A | 9/1999 | King et al. | |
| 5,970,505 A * | 10/1999 | Ebrahim | 707/501.1 |
| 5,982,891 A | 11/1999 | Ginter et al. | |
| 5,987,480 A | 11/1999 | Donohue et al. | |
| 5,991,756 A | 11/1999 | Wu | |
| 5,999,664 A | 12/1999 | Mahoney et al. | |
| 6,003,040 A | 12/1999 | Mital et al. | |
| 6,009,442 A | 12/1999 | Chen et al. | |
| 6,012,072 A | 1/2000 | Lucas et al. | |
| 6,012,074 A | 1/2000 | Lucas et al. | |
| 6,014,677 A | 1/2000 | Hayashi et al. | |
| 6,016,492 A | 1/2000 | Saxton et al. | |
| 6,023,714 A | 2/2000 | Hill et al. | |
| 6,023,715 A | 2/2000 | Burkes et al. | |
| 6,029,182 A | 2/2000 | Nehab et al. | |
| 6,031,989 A | 2/2000 | Cordell | |
| 6,038,567 A | 3/2000 | Young | |
| 6,038,574 A * | 3/2000 | Pitkow et al. | 707/513 |
| 6,040,832 A | 3/2000 | Poreh et al. | |
| 6,049,799 A | 4/2000 | Mangat et al. | |
| 6,072,481 A | 6/2000 | Matsushita et al. | |
| 6,094,657 A * | 7/2000 | Hailpern et al. | 707/103 |
| 6,101,510 A | 8/2000 | Stone et al. | |
| 6,108,661 A | 8/2000 | Caron et al. | |
| 6,112,181 A | 8/2000 | Shear et al. | |
| 6,122,647 A * | 9/2000 | Horowitz et al. | 707/513 |
| 6,122,649 A | 9/2000 | Kanerva et al. | |
| 6,199,082 B1 | 3/2001 | Ferrel et al. | |
| 6,226,682 B1 * | 5/2001 | Murray | 707/501.1 |
| 6,240,407 B1 * | 5/2001 | Chang et al. | 707/2 |

OTHER PUBLICATIONS

Simpson, A. "Mastering Wordperfect 5.1 & 5.2 for Windows", San Francisco:Sybex, 1993, pp. 837–846.

Celantano et al. "A Multiple Presentation Document Management System", Proceedings of the 10th Annual ACM Conference on Systems Documentation, Oct. 13–16, 1992, pp. 63–71.

Tayeb–Bey et al., Analysis and conversion of documents, IEEE Proceedings on Pattern Recognition, vol. 2, pp.1089–1091.

Zeller E: Seamless integration of online 1–12 services in the Oberon document system Modular Programming Languages, Joint Modular Languages Conference, JMLC'97. Proceedings, Proceedings of 1997 Joint Modular Languages Conference, Linz, Austria, Mar. 19–21, 1997, pp. 366–379, XP000940821 1997, Berlin, Germany, Springer–Verlag, Germany.

Dewan et al., A High–Level and Flexible Framework for Implementing Multiuser Interfaces, ACM Transactions on Information Systems, vol. 10, No. 4, pp. 345–380.

Bier, Eric A., "EmbeddedButtons: Supporting Buttons in Documents", ACM Transactions on Information Systems, vol. 10, No. 4, pp. 381–407.

Dewan et al., "Flexible user interface coupling in a colaboratibe system", Conference on Human Factors and Computing Systems, pp. 41–48.

Calvary et al., "From single–user architectural design to PAC*: a generic software architecture model for CSCW", Conference on Human Factors and Computing Systems, pp. 242–249.

Bier, Eric A., "EmbeddedButtons: documents as user interfaces", Symposium on User Interface Software and Technology, pp. 45–53.

Benford et al., "Informing the design of collaborative virtual environments", Conference on Supporting Group Work, pp. 71–80.

Buyukkokten, F. et al., "Document Management in Haldoc", IEEE Electrotechnical Conf., v1, pp. 379–382.

Dykstra–Erickson et al, "The role of user studies in the design of OpenDoc", ACM Symposium on Designing Interactive Systems, pp. 111–120.

Sleeter, Melissa E., "OpenDoc–building online help for a component–oriented architecture", Annual ACM Conference on Systems Documentation, pp. 87–94.

Alder R M: "Emerging standards for component software" Computer, Mar. 1995, USA, vol. 28, No. 3, pp. 68–77.

Caplinger, Michael, An information system based on distributed objects, ACM Conference on Object Oriented Programming Systems Languages and Applications, Oct. 4–8, 1996, pp. 126–137.

Maes P: "Concepts and experiments in computational reflection" OPPSLA '87: Conference on Object Oriented Programming, Systems, Languages, and Applications, Orlando, FL, USA, Oct. 4–8, 1987, vol. 22, No. 12, pp. 147–155.

Shoens K. et al.: "The Rufus System: information organization for semi–structured data", 19th International Conference on Very Large Data Bases Proceedings, Proceeding of 19th International Conference on Very Large Data Bases, Dublin, Ireland, Aug. 24–27, 1993, pp. 97–107, 1993, Palo Alto, CA, USA, Morgan Kaufmann Publishers, USA.

Edwards, W.K. and LaMarca, A. "Balancing Generality and Specificity in Document Management Systems", Proceedings of the 7th IFIP Conference on Human–Computer Interaction, Aug. 30–Sep. 1999.

R. Bentley & P. Dourish: "Medium versus Mechanism: Supporting Collaboration through Customisation". Proceedings. The 4th European Conference on Computer–Supported Cooperative Work ECSCW'95, 'Online! Sep. 10–14, 1995, pp. 1–9.

Gunnar Teege: "Feature Combination: A New 1–24 Approach to Tailorable Groupware" Proceedings Group '97–PROC Workshop on Tailorable Groupware: Issues, Methods, and Architectures, 'Online! Nov. 16, 1997, pp. 1–9.

Gunnar Teege: "Feature Combination: Position Paper about Composiblity Issues In Object Orientation" Proceedings ECOOP'96–Workshop on Composability Issues In Object–Orientation, 'Online! Jul. 9, 1996, pp. 1–6.

M. Fredriksson: "Active Documents" Second HK/R Student Conference on Advance Object–Oriented Concepts, 'Online! Jan. 17, 1997, pp. 1–10.

M. Fredriksson & M. Svahnberg: "Fargo: Technical Description" 'Online! 1997, University College of Karlskrona/Ronneby, SE.

G. Starovic, V. Cahill and B. Tangney: "An Event–Based Object Model for Distributed Programming" 'Online! Dec. 1995, Trinity College Dublin, TCD–CS–95–28, Dublin, IE.

Interposition Agents: Transparently Interposing User Code at the System Interface, Michael B. Jones, (Microsoft Research, Microsoft Corp.).

SLIC: An Extensibility System for Commodity Operating Systems, Ghormley et al., (Computer Science Division, Univ. of CA at Berkley).

Finding and Reminding: File Organization From The Desktop, Barreau et al., (SIGCHI, vol. 27, No. 3, Jul. 1995).

Finding and Reminding, Reconsidered, Fertig et al., (SIGCHI, vol. 28, No. 1 Jan. 1996).

Information Visualization Using 3D Interactive Animation, Robertson et al. (Communications of the ACM, vol. 36, No. 4, Apr. 1993).

Using a Landscape Metaphor to Represent a Corpus of Documents, Matthew Chalmers, (Rank Xerox EuroPARC, in Proc. European Conf. on Spatial Information Theory, Elba, Sep. 1993).

Lifestreams: Organizing Your Electronic Life, Freeman et al., (Yale University, Dept. of Computer Science).

Semantic File Systems, Gifford et al., (Programming Systems Research Group, 1991 ACM 0–89791–447–2/91/0009/0016).

The Digital Library Integrated Task Environment (Dlite), Cousins et al., (Stanford University / Xerox PARC).

A Pile Metaphor for Supporting Casual Oranization of Information, Mander et al., (Chi '92, 1992 ACM 0–89791–513–5/92/0050–0627).

Representing Information About Files, Jeffrey Mogul, (Computer Science Dept. Stanford, University, CH2021–4/84/0000/0432401.00 1984 IEEE).

* cited by examiner

TAGGING RELATED FILES IN A DOCUMENT MANAGEMENT SYSTEM

This is a divisional of application Ser. No. 09/144,032, filed Aug. 31, 1998 U.S. Pat. No. 6,266,682.

BACKGROUND OF THE INVENTION

The following applications are related to the present invention: U.S. Ser. No. 09/143,802, now U.S. Pat. No. 6,266,670, Anthony G. LaMarca, et al., entitled USER LEVEL ACCESSING OF LOW-LEVEL COMPUTER SYSTEM OPERATIONS; U.S. Ser. No. 09/143,551, now U.S. Pat. No. 6,308,179, Karin Petersen, et al., entitled PROPERTY-BASED USER LEVEL DOCUMENT MANAGEMENT; U.S. Ser. No. 09/143,778, now U.S. Pat. No. 6,269,380, Douglas B. Terry, et al., entitled A PROPERTY-BASED MECHANISM FOR FLEXIBLY SUPPORTING FRONT-END AND BACK-END COMPONENTS HAVING DIFFERENT COMMUNICATION PROTOCOLS; U.S. Ser. No. 09/144,143, now U.S. Pat. No. 6,370,553, Warren K. Edwards, et al., entitled ATOMIC AND MOLECULAR DOCUMENTS; U.S. Ser. No. 09/143,555, now U.S. Pat. No. 6,397,231, Michael P. Salisbury, et al, entitled VIRTUAL DOCUMENTS; U.S. Ser. No. 09/144,383, now U.S. Pat. No. 6,324,551, John O. Lamping, et al, entitled SELF CONTAINED DOCUMENT MANAGEMENT BASED ON DOCUMENT PROPERTIES; U.S. Ser. No. 09/143,773, now U.S. Pat. No. 6,240,429, James D. Thornton, et al., entitled SERVICE INTERACTION USING PROPERTIES ATTACHED TO DOCUMENTS; U.S. Ser. No. 09/144,231, now U.S. Pat. No. 6,253,217, James P. Dourish, et al., entitled ACTIVE PROPERTIES FOR DYNAMIC SYSTEM CONFIGURATION; U.S. Ser. No. 09/143,777, Warren K. Edwards, et al., entitled EXTENDING APPLICATION BEHAVIOR THROUGH DOCUMENT PROPERTIES; U.S. Ser. No. 09/143,772, now U.S. Pat. No. 6,330,573, Michael P. Salisbury, et al., entitled MAINTAINING DOCUMENT IDENTITY ACROSS FILE SYSTEM INTERFACES. Each of the above applications filed Aug. 31, 1998 and assigned to a common assignee are hereby incorporated by reference.

The present invention is directed to document management systems. It finds particular application to a system and method which inserts tags in file paths to define a dynamic collection of related files and will be described with particular reference thereto.

The inventors have recognized that a large amount of a user's interaction with a computer has to do with document management, such as storing, filing, organizing and retrieving information from numerous electronic documents. These documents may be found on a local disc, on a network system file server, an e-mail file server, the world wide web, or a variety of other locations. Modem communication delivery systems have had the effect of greatly increasing the flow of documents which may be incorporated within a user's document space, thereby increasing the need for better tools to visualize and interact with the accumulated documents.

The most common tools for organizing a document space rely on a single fundamental mechanism known as hierarchical storage systems, wherein documents are treated as files that exist in directories or folders, which are themselves contained in other directories, thereby creating a hierarchy that provides the structure for document space interactions. Each directory in a hierarchy of directories, will commonly contain a number of individual files. Typically, files and directories are given alpha-numeric, mnemonic names in large storage volumes shared via a network. In such a network, individual users may be assigned specific directories.

A file located in a sub-directory is located by its compound path name. For example, the character string D:\TREE\LIMB\BRANCH\TWIG\LEAF.FIL could describe the location of a file LEAF.FIL whose immediate directory is TWIG and which is located deep in a hierarchy of files on the drive identified by the letter D. Each directory is itself a file containing file name, size, location data, and date and time of file creation or changes.

Navigation through a file system, to a large degree, can be considered as navigation through semantic structures that have been mapped onto the file hierarchy. Such navigation is normally accomplished by the use of browsers and dialog boxes. Thus, when a user traverses through the file system to obtain a file (LEAF.FIL), this movement can be seen not only as a movement from one file or folder to another, but also as a search procedure that exploits features of the documents to progressively focus on a smaller and smaller set of potential documents. The structure of the search is mapped onto the hierarchy provided by the file system, since the hierarchy is essentially the only existing mechanism available to organize files. However, documents and files are not the same thing.

Since files are grouped by directories, associating a single document with several different content groupings is cumbersome. The directory hierarchy is also used to control the access to documents, with access controls placed at every node of the hierarchy, which makes it difficult to grant file access to only one or a few people. In the present invention, separation of a document's inherent identity from its properties, including its membership in various document collections, alleviates these problems.

Other drawbacks include that existing hierarchical file systems provide a "single inheritance" structure. Specifically, files can only be in one place at a time, and so can occupy only one spot in the semantic structure. The use of links and aliases are attempts to improve upon such a limitation. Thus, while a user's conception of a structure by which files should be organized may change over time, the hierarchy described above is fixed and rigid. While moving individual files within such a structure is a fairly straight-forward task, reorganizing large sets of files is much more complicated, inefficient and time consuming. From the foregoing it can be seen that existing systems do not address a user's need to alter a file structure based on categories which change over time. At one moment a user may wish to organize the document space in terms of projects, while at some time in the future the user may wish to generate an organization according to time and/or according to document content. A strict hierarchical structure does not allow management of documents for multiple views in a seamless manner resulting in a decrease in the efficiency of document retrieval.

Existing file systems also support only a single model for storage and retrieval of documents. This means a document is retrieved in accordance with a structure or concepts given to it by its author. On the other hand, a user—who is not the author—may wish to retrieve a document in accordance with a concept or grouping different from how the document was stored.

Further, since document management takes place on a device having computational power, there would be benefits to harnessing the computational power to assist in the organization of the documents. For example, by attaching a spell-checker property to a document, it can extend the read operation of a document so that the content returned to the requesting application will be correctly spelled.

The inventors are aware that others have studied the area of document management/storage systems.

DMA is a proposed standard from AIIM designed to allow document management systems from different vendors to interoperate. The DMA standard covers both client and server interfaces and supports useful functionality including collections, versioning, renditions, and multiple-repository search. A look at the APIs show that DMA objects (documents) can have properties attached to them. The properties are strongly typed in DMA and must be chosen from a limited set (string, int, date . . . ). To allow for rich kinds of properties, one of the allowable property types is another DMA object. A list type is allowed to build up big properties. Properties have a unique IDs in DMA. Among the differences which exist to the present invention, is the properties are attached to documents without differentiation about which user would like to see them; properties are stored in the document repository that provides the DMA interface, not independently from it. Similarly, DMA does not provide support for active properties.

WebDAV is another interface designed to allow an extended uniform set of functionality to be attached with documents available through a web server. WebDAV is a set of extensions to the HTTP 1.1 protocol that allow Web clients to create and edit documents over the Web. It also defines collections and a mechanism for associating arbitrary properties with resources. WebDAV also provides a means for creating typed links between any two documents, regardless of media type where previously, only HTML documents could contain links. Compared to the present invention, although WebDAV provides support for collections, these are defined by extension (that is all components have to be explicitly defined); and although it provides arbitrary document properties, these live with the document itself and cannot be independently defined for different users, furthermore there is no support for active properties and are mostly geared toward having ASCII (or XML) values.

DocuShare is a simple document management system built as a web-server by Xerox Corporation. It supports simple collections of documents, limited sets of properties on documents and support for a few non-traditional document types like calendars and bulletin boards. It is primarily geared toward sharing of documents of small, self-defined groups (for the latter, it has support to dynamically create users and their permissions.) DocuShare has notions of content providers, but these are not exchangeable for a document. Content providers are associated with the type of the document being accessed. In DocuShare properties are static, and the list of properties that can be associated with a document depends on the document type. Users cannot easily extend this list. System administrators must configure the site to extend the list of default properties associated with document types, which is another contrast to the present invention. Also, in DocuShare properties can be visible to anyone who has read access for the collection in which the document is in. Properties are tightly bound to documents and it is generally difficult to maintain a personalized set of properties for a document, again a different approach than the one described in the present invention.

An operating system "SPIN" from the University of Washington allows users to inject code into the kernel that is invoked when an appropriate system call or system state occurs. (For example, users can inject code that alters paging decisions.) If it has already been done, their technology could be used to make it possible to inject code into the file system to invoke a user's code on read and write. Among the differences between SPIN and the concepts of present invention are that code injected into SPIN runs at the kernel level and users can only express their behaviors in a restricted, safe language in which it is not possible to do "bad things." As such, expressiveness is limited. On the other hand, the properties in the present invention run at the user level, and can have GUIs call out to third party libraries and in general be far more expressive than a kernel injected spindle. Further, the properties of the present invention are expressed in terms of documents, as in "I attach property X to Document Y." The SPIN system, on the other hand, extends a system call such as "read". The example behaviors mentioned above are more easily mapped into a system such as the present invention in which properties are explicitly attached to individual documents.

Other work which allows operating system calls to be extended into user's code include, the article "Interposition Agents: Transparently Interposing User Code and System Interface," by Michael B. Jones in Proceedings of the 14$^{th}$ Symposium on Operating Systems, Principles, Asheville, N.C., December, 1993, pages 80–93. The article "SLIC: An Extensibility System for Commodity Operating Systems," by Douglas P. Ghormley, Steven H. Rodriguez, David Petrou, Thomas E. Anderson, which is to appear in the USENIX 1998 Annual Technical Conference, New Orleans, La., June 1998.

Further, the Windows NT (from Microsoft) has a function called "Filter Drivers" which, once installed, can see the accesses made to a file system. Installing filter drivers is a privileged operation, not available to normal users. As such, a user level mechanism, such as the document properties of the present invention and event dispatching architecture would be needed to allow users to express their desired behaviors.

There are also systems which, in a very specific domain, allow users to apply behaviors when documents are accessed. An example is the Tandem e-mail system, which has a "screen cobal" language and has hooks to find out when events occur. This system allows users to code filters to do custom operations when documents arrive and/or read. One of the differences between this system and the present invention, is that the Tandem system solves the problem in a specific domain and invokes only the user's behaviors when the documents are accessed via the mail application. In the present invention, the behaviors are invoked regardless of the application and regardless of the interface.

The paper, "Finding and Reminding: File Organization From the Desktop", D. Barreau and B. Nardi, SIGCHI Bulletin, 27 Jul. 3, 1995, reviews filing and retrieval practices and discusses the shortcomings of traditional file and retrieval mechanisms. The paper illustrates that most users do not employ elaborate or deep filing systems, but rather show a preference for simple structures and "location-based searches", exploiting groupings of files (either in folders, or on the computer desktop) to express patterns or relationships between documents and to aid in retrieval.

In response to the Barreau article, the article, "Find and Reminding Reconsidered", by S. Fertig, E. Freeman and D. Gelernter, SIGCHI Bulletin, 28(1) January, 1996, defends deep structure and search queries, observing that location-based retrieval is, "nothing more than a user-controlled logical search." There is, however, one clear feature of location-based searching which adds to a simple logical search—in a location-based system, the documents have been subject to some sort of pre-categorization. Additional structure is then introduced into the space, and this structure is exploited in search and retrieval.

The article "Information Visualization Using 3D Interactive Animation", by G. Robertson, S. Card and J. Mackinlay, Communications of the ACM 36 (4) April, 1993, discusses a location-based structure, an interesting feature is that it is exploited perceptually, rather than cognitively. This moves the burden of retrieval effort from the cognitive to the perceptual system. While this approach may be effective, the information that the systems rely on is content-based, and extracting this information to find the structure can be computationally expensive.

The article "Using a Landscape Metaphor to Represent a Corpus of Documents," Proc. European Conference on Spatial Information Theory, Elba, September, 1993, by M. Chalmers, describes a landscape metaphor in which relative document positions are derived from content similarity metrics. A system, discussed in "Lifestreams: Organizing your Electronic Life", AAAI Fall Symposium: AI Applications in Knowledge Navigation on Retrieval (Cambridge, Mass.), E. Freeman and S. Fertig, November, 1995, uses a timeline as the major organizational resource for managing document spaces. Lifestreams is inspired by the problems of a standard single-inheritance file hierarchy, and seeks to use contextual information to guide document retrieval. However, Lifestreams replaces one superordinate aspect of the document (its location in the hierarchy) with another (its location in the timeline).

The article "Semantic File Systems" by Gifford et al., Proc. Thirteenth ACM Symposium of Operating Systems Principals (Pacific Grove, Calif.) October, 1991, introduces the notion of "virtual directories" that are implemented as dynamic queries on databases of document characteristics. The goal of this work was to integrate an associating search/retrieval mechanism into a conventional (UNIX) file system. In addition, their query engine supports arbitrary "transducers" to generate data tables for different sorts of files. Semantic File System research is largely concerned with direct integration into a file system so that it could extend the richness of command line programming interfaces, and so it introduces no interface features at all other than the file name/query language syntax. In contrast, the present invention is concerned with a more general paradigm based on a distributed, multi-principal property-based system and with how interfaces can be revised and augmented to deal with it; the fact that the present invention can act as a file system is simply in order to support existing file system-based applications, rather than as an end in itself DLITE is the Stanford Digital Libraries Integrated Task Environment, which is a user interface for accessing digital library resources as described in "The Digital Library Integrated Task Environment" Technical Report SIDL-WP-1996-0049, Stanford Digital Libraries Project (Palo Alto, Calif.) 1996, by S. Cousins et al. DLITE explicitly reifies queries and search engines in order to provide users with direct access to dynamic collections. The goal of DLITE, however, is to provide a unified interface to a variety of search engines, rather than to create new models of searching and retrieval. So although queries in DLITE are independent of particular search engines, they are not integrated with collections as a uniform organizational mechanism.

Multivalent documents define documents as comprising multiple "layers" of distinct but intimately-related content. Small dynamically-loaded program objects, or "behaviors", activate the content and work in concert with each other and layers of content to support arbitrarily specialized document types. To quote from one of their papers, "A document management infrastructure built around a multivalent perspective can provide an extensible, networked system that supports incremental addition of content, incremental addition of interaction with the user and with other components, reuse of content across behaviors, reuse of behaviors across types of documents, and efficient use of network bandwidth."

Multivalent document behaviors (analogs to properties) extend and parse the content layers, each of which is expressed in some format. Behaviors are tasked with understanding the formats and adding functionality to the document based on this understanding. In many ways, the Multivalent document system is an attempt at creating an infrastructure that can deal with the document format problem by incrementally adding layers of "understanding" of various formats. In contrast, the present invention has an explicit goal of exploring and developing a set of properties that are independent of document format. While properties could be developed that could parse and understand content, it is expected that most will be concerned with underlying storage, replication, security, and ownership attributes of the documents. Included among the differences between the present invention and the Multivalent concepts are that, the Multivalent document system focuses on extensibility as a tool for content presentation and new content-based behaviors; the present invention focuses on extensible and incrementally-added properties as a user-visible notion to control document storage and management.

File systems known as the Andrew File System (AFS), Coda, and Ficus provide a uniform name space for accessing files that may be distributed and replicated across a number of servers. Some distributed file systems support clients that run on a variety of platforms. Some support disconnected file access through caching or replication. For example, Coda provides disconnected access through caching, while Ficus uses replication. Although the immediately described distributed file systems support document (or file) sharing, they have a problem in that a file's hierarchical pathname and its storage location and system behavior are deeply related. The place in the directory hierarchy where a document gets stored generally determines on which servers that file resides.

Distributed databases such as Oracle, SQL Server, Bayou, and Lotus Notes also support shared, uniform access to data and often provide replication. Like some distributed file systems, many of today's commercial databases provide support for disconnected operation and automatic conflict resolution. They also provide much better query facilities than file systems. However, distributed databases suffer the same problems as file systems in that the properties of the data, such as where it is replicated and how it is indexed and so on, are generally associated with the tables in which that data resides. Thus, these properties cannot be flexibly managed and updated. Also, the set of possible properties is not extensible.

A digital library system, known as the Documentum DocPage repository, creates a document space called a "DocBase." This repository stores a document as an object that encapsulates the document's content along with its attributes, including relationships, associated versions, renditions, formats, workflow characteristics, and security. These document objects can be infinitely combined and re-combined on demand to form dynamic configurations of document objects that can come from any source.

DocPage supports organization of documents via folder and cabinet metaphors, and allows searching over both document content and attributes. The system also provides checkin/checkout-style version control, full version histories of documents, and annotations (each with its own attributes and security rules). The system also supports workflow-style features including notification of updates. DocBase uses a replicated infrastructure for document storage (see: http://www.documentum.com).

Among the differences between Documentum DocPage and the present invention are: First, in the present system properties are exposed as a fundamental concept in the infrastructure. Further, the present system provides for a radically extensible document property infrastructure capable of supporting an aftermarket in document attributes. Documentum seems to be rather closed in comparison; the possible attributes a document can acquire are defined a priori by the system and cannot be easily extended. Additionally, Documentum does not have the vision of universal access to the degree of the present invention which supports near-universal access to document meta-data, if not document content. In comparison, the scope of Documentum narrows to document access within a closed setting (a corporate intranet).

In a traditional file system, documents typically reside in one and only one directory. When an application, such as a word processor, processes a document, the application stores auxiliary data and support files, such as backups, spelling files and images, for the document in the same directory as the document. Future executions of the application on the document rely on the support files and auxiliary data to be in the same directory as the document. However, the document may belong to a variety of collections or folders according to a user's organizational structure. It is not appropriate for the document management system to add these auxiliary files to all of the collections that the base document belongs to. This might violate the semantics of the user's organizational structure. For example, while the document may belong in a "very important" folder, its automatic backup file should not. Similarly, if a document is not a member of any collections, there is no logical place for the supporting documents to be placed.

The present invention contemplates a new and improved method and system for organizing related files and which overcomes the above-referenced problems and others.

SUMMARY OF THE INVENTION

In accordance with one aspect of the present invention, a method of managing a first document and a second document which are related to each other and are identified by a location path and name is provided. A path tag is associated to the first document which identifies the first document. The path tag is then associated to the second document as a property representing a relationship to the first document. Both the first and second documents are retrievable by a single query based on the path tag.

In accordance with another aspect of the present invention, in a system where an application stores and retrieves a document based on a path and filename, and stores and retrieves supporting files of the document based on the path, a method of generating a dynamic collection of related documents including the document and the supporting files is provided. A tag is inserted in the path of the document where the tag is a unique identifier of the document. A supporting file is generated for the document and the tag is associated to the supporting file such that the supporting file and document are identified and retrieved as a collection based on the tag.

One advantage of the present invention is that by using path tagging to represent dynamic collections of documents, a problem is solved of both supporting non-DMS aware applications while allowing documents to reside in multiple collections without cluttering the collections with supporting files.

Another advantage of the present invention is that by dynamically grouping related files base on a unique tag, the document management system can easily identify and retrieve related files to a requesting application which otherwise would not be able to identify and retrieve the related files.

Still further advantages of the present invention will become apparent to those of ordinary skill in the art upon reading and understanding the following detailed description of the preferred embodiments.

BRIEF DESCRIPTION OF THE DRAWINGS

The following is a brief description of each drawing used to describe the present invention, and thus, are being presented for illustrative purposes only and should not be limitative of the scope of the present invention, wherein.

DETAILED DESCRIPTION OF THE PREFERRED EMBODIMENT

Prior to discussing the present invention in greater detail, it is believed a glossary of terms used in the description would be beneficial. Therefore, the following definitions are set forth:

Action: The behavior part of a property.

Active Property: A property in which code allows the use of computational power to either alter the document or effect another change within the document management system.

Arbitrary: Ability to provide any property onto a document.

Base Document: Corresponds to the essential bits of a document. There is only one Base Document per document. It is responsible for determining a document's content and may contain properties of the document, and it is part of every principal's view of the document.

Base Properties: Inherent document properties that are associated with a Base Document.

Bit Provider: A special property of the base document. It provides the content for the document by offering read and write operations. It can also offer additional operations such as fetching various versions of the document, or the encrypted version of the content.

Browser: A user interface which allows a user to locate and organize documents.

Collection: A type of document that contains other documents as its content.

Combined Document: A document which includes members of a collection and content.

Content: This is the core information contained within a document, such as the words in a letter, or the body of an e-mail message.

Content Document: A document which has content.

Distributed: Capability of the system to control storage of documents in different systems (i.e., file systems, www, e-mail servers, etc.) in a manner invisible to a user. The system allows for documents located in multi-repositories to be provided to a principal without requiring the principal to have knowledge as to where any of the document's content is stored.

DMS: Document Management System

Document: This refers to a particular content and to any properties attached to the content. The content referred to may be a direct referral or an indirect referral. The smallest element of the DMS. There are four types of documents; Collection, Content Document, No-Content Document and Combined Document.

Document Handle: Corresponds to a particular view on a document, either the universal view, or that of one principal.

DocumentID: A unique identifier for each Base Document. A Reference Document inherits the DocumentID from its referent. Document identity is thus established via the connections between Reference Document References and Base Documents. Logically, a single document is a Base Document and any Reference Documents that refer to it.

Kernel: Manages all operations on a document. A principal may have more than one kernel.

Multi-Principal: Ability for multiple principals to have their own set of properties on a Base Document wherein the properties of each principal may be different.

Notification: Allows properties and external devices to find out about operations and events that occur elsewhere in DMS.

No Content Document: A document which contains only properties.

Off-the-Shelf Applications: Existing applications that use protocols and document storage mechanisms provided by currently existing operating systems.

Principal: A "User" of the document management system. Each person or thing that uses the document management system is a principal. A group of people can also be a principal. Principals are central because each property on a document can be associated with a principal. This allows different principals to have different perspectives on the same document.

Property: Some bit of information or behavior that can be attached to content. Adding properties to content does not change the content's identity. Properties are tags that can be placed on documents, each property has a name and a value (and optionally a set of methods that can be invoked).

Property Generator: Special case application to extract properties from the content of a document.

Reference Document: Corresponds to one principal's view of a document. It contains a reference to a Base Document (Reference Document A refers to Base Document B) and generally also contains additional properties. Properties added by a Reference Document belong only to that reference; for another principal to see these properties, it must explicitly request them. Thus, the view seen by a principal through his Reference Document is the document's content (through the Base Document), and a set of properties (both in the reference and on the Base Document). Even an owner of a Base Document can also have a Reference Document to that base, in which he places personal properties of the document that should not be considered an essential part of the document and placed in all other principal's view.

Space: The set of documents (base or references) owned by a principal.

Static Property: A name-value pair associated with the document. Unlike active properties, static properties have no behavior. Provides searchable meta-data information about a document.

Introduction

As discussed in the background of the invention, the structure that file systems provide for managing files becomes the structure by which users organize and interact with documents. However, documents and files are not the same thing. The present invention has as an immediate goal to separate management of properties related to the document or concerning the document from the management of the document content. Therefore, user-specific document properties are managed close to the document consumer or user of the document rather than where the document is stored. Separation of the management of user properties from the document content itself provides the ability to move control of document management from a closed file system concept to a user-based methodology.

Figure 1:
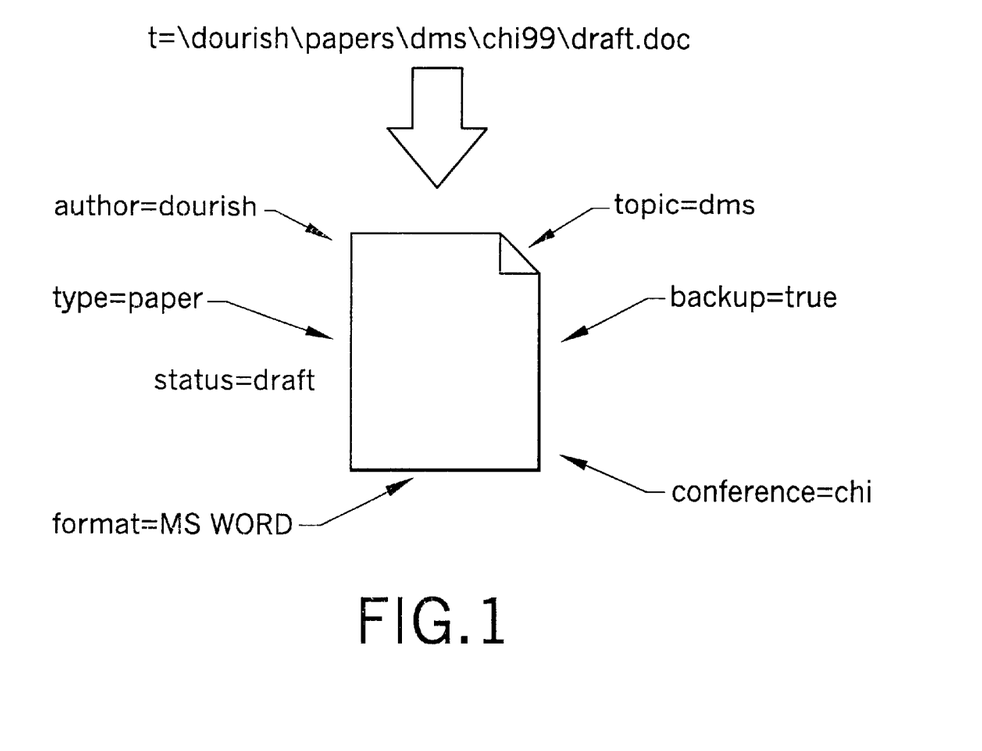
FIG. 1 shows a hierarchical storage mechanism compared to the concept of properties of the present invention.

FIG. 1 illustrates a distinction between hierarchical storage systems whose documents are organized in accordance with their location described by a hierarchical structure and the present invention where documents are organized according to their properties (e.g. author=dourish, type=paper, status=draft, etc.). This means documents will retain properties even when moved from one location to another, and that property assignment can have a fine granularity.

Figure 2:
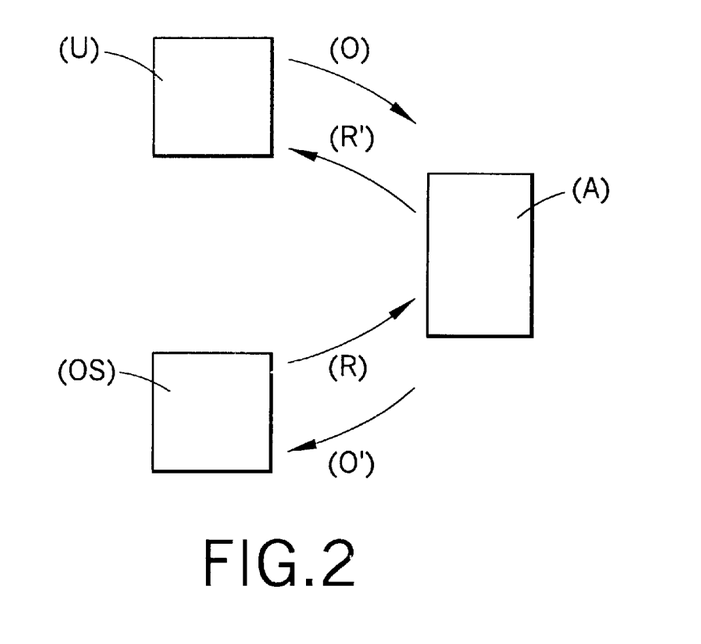
FIG. 2 is a block diagram of a document management system according to the present invention, interposed within a communication channel between a user and an operating system.

To integrate properties within the document management system of the present invention, the properties need to be presented within the content and/or property read/write path of a computer system, with the ability to both change the results of an operation as well as take other actions. The outline of the concept is described in FIG. 2, where once user (U) issues an operation request (O), prior to that operation being performed by operating system (OS), a call is made to document management system (DMS) A of the present invention, which allows DMS A to function so as to achieve the intended concepts of the present invention. This includes having DMS A interact with operating system (OS), through its own operation request (O'). Once operation request (O') is completed, the results are returned (R) to DMS A which in turn presents results (R') to user (U).

With these basic concepts having been presented, a more detailed discussion of the invention is set forth below.

Document Management System (DMS) Architecture

Figure 3:
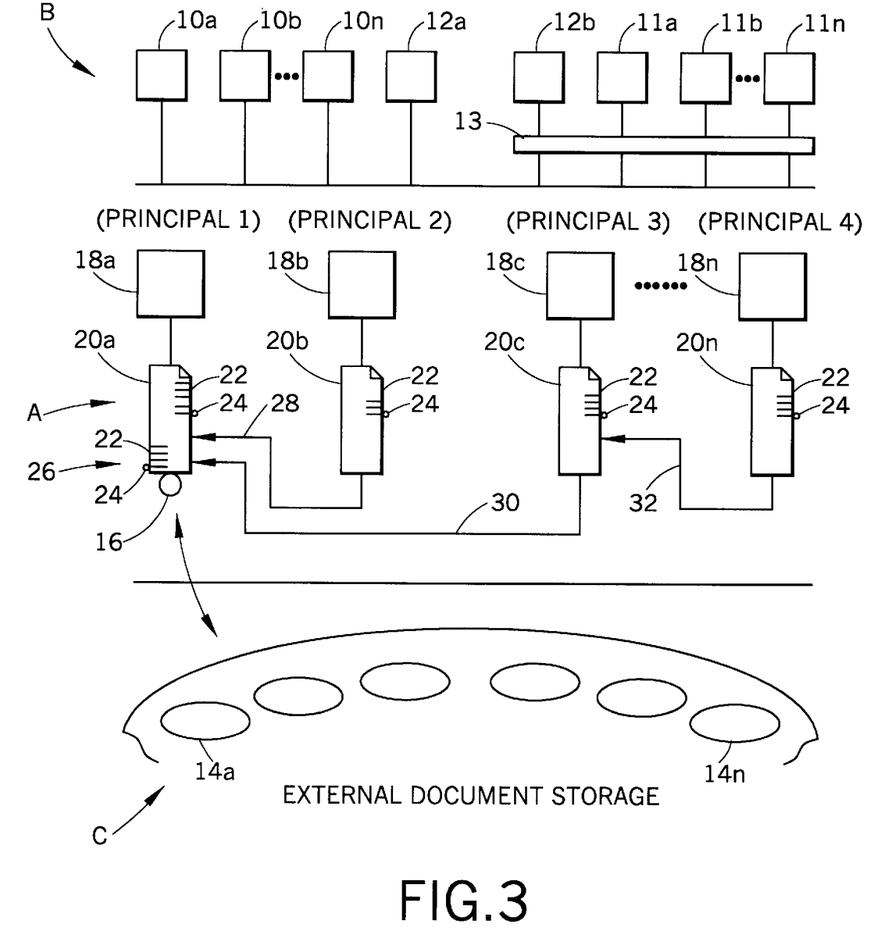
FIG. 3 is a representation of a document management system of the present invention implemented in a computer system.

FIG. 3 sets forth the architecture of a document management system (DMS) A of the present invention in greater detail. Document management system (DMS) A is shown configured for operation with front-end components B, and back-end components C. Front-end components B include applications 10*a*–10*n* and 11*a*–11*n*, such as word processing applications, mail applications among others. Some of the applications are considered DMS aware 10a–10n which means these applications understand DMS protocols for storing, retrieving and otherwise interacting with DMS A. Other components are considered non-DMS aware 11a–11n. Browsers 12a (DMS aware) and 12b (non-DMS aware) are considered specialized forms of applications. In order for the non-DMS-aware applications 11a–11n and 12b to be able to communicate with DMS A, front-end translator 13 is provided.

Similarly, back-end components C can include a plurality of repositories 14a–14n, where the content of documents are stored. Such repositories can include the hard disc of a principal's computer, a file system server, a web page, a dynamic real time data transmission source, as well as other data repositories. To retrieve data content from repositories 14a–14n, bit providers, such as bit provider 16, are used. These bit providers are provided with the capability to translate appropriate storage protocols.

Principals 1–n each have their own kernel 18a–18n for managing documents, such as documents 20a–20n. Documents 20a–20n are considered to be documents the corresponding principal 1–n has brought into its document management space. Particularly, they are documents that a principal considers to be of value and therefore has in some manner marked as a document of the principal. The document, for example, may be a document which the principal created, it may be an e-mail sent or received by the principal, a web page found by the principal, a real-time data input such as an electronic camera forwarding a continuous stream of images, or any other form of electronic data (including video, audio, text, etc.) brought into the DMS document space. Each of the documents 20a–20n have static properties 22 and/or active properties 24 placed thereon.

Document 20a, is considered to be a base document and is referenced by reference documents 20b–20c. As will be discussed in greater detail below, in addition to base document 20a having static properties 22 and/or active properties 24, base document 20a will also carry base properties 26 which can be static properties 22 and/or active properties 24. Static properties are shown with a "-" and active properties are shown with a "-o".

Reference documents 20b–20c are configured to interact with base document 20a. Both base documents and reference documents can also hold static properties 22 and/or active properties 24. When principals 2,3 access base document 20a for the first time, corresponding reference documents 20b–20c are created under kernels 18b–18c, respectively. Reference documents 20b–20c store links 28 and 30 to unambiguously identify their base document 20a. In particular, in the present invention each base document is stored with a document ID which is a unique identifier for that document. When reference documents 20b–20c are created, they generate links to the specific document ID of their base document. Alternatively, if principal n references reference document 20c, reference document 20n is created with a link 32 to reference document 20b of Principal 3. By this link principal n will be able to view (i.e. its document handle) the public properties principal 3 has attached to its reference document 20c as well as the base properties and public reference properties of base document 20a. This illustrates the concept of chaining.

The above described architecture allows for sharing and transmission of documents between principals and provides the flexibility needed for organizing documents. With continuing attention to FIG. 3, it is to be noted at this point that while links 28–30 are shown from one document to another, communication within DMS A is normally achieved by communication between kernels 18a–18n. Therefore, when DMS A communicates with either front-end components B, back-end components C, or communication occurs between principals within DMS A, this communication occurs through kernels 18a–18n. It is however, appreciated the invention will work with other communication configurations as well.

Using the described architecture, DMS A of the present invention does not require the principal to operate within a strict hierarchy such as in file or folder-type environments. Rather, properties 22,24 which are attached to documents allows a principal to search and organize documents in accordance with how the principal finds it most useful.

For instance, if principal 1 (owner of kernel 18a) creates a base document with content, and stores it within DMS A, and principal 2 (owner of kernel 18b) wishes to use that document and organize it in accordance with its own needs, principal 2 can place properties on Reference Document 20b. By placement of these properties, principal 2 can retrieve the base document in a manner different than that envisioned by principal 1.

Further, by interacting with browser 12, a principal may run a query requesting all documents having a selected property. Specifically, a user may run query language requests over existing properties.

Therefore, a point of the present invention is that DMS A manages a document space where properties are attached by different principals such that actions occur which are appropriate for a particular principal, and are not necessarily equivalent to the organizational structure of the original author of a document or even to other principals.

Another noted aspect of the present invention is that since the use of properties separates a document's inherent identity from its properties, from a principal's perspective, instead of requiring a document to reside on a single machine, documents in essence can reside on multiple machines (base document 20a can reside on all or any one of kernels 18a–18n). Further, since properties associated with a document follow the document created by a principal (for example, properties on document 20b of kernel 18b, may reference base document 20a), properties of document 20b will run on kernel 18b, even though the properties of document 20b are logically associated with base document 20a. Therefore, if a property associated with document 20b (which references base document 20a) incurs any costs due to its operation, those costs are borne by kernel 18b (i.e. principal 2), since properties are maintained with the principal who put the properties onto a document.

Support for Native Applications

A DMS document interface provides access to documents as Java objects. Applications can make use of this interface by importing the relevant package in their Java code, and coding to the API provided for accessing documents, collections and properties. This is the standard means to build new DMS-aware applications and to experiment with new interaction models. DMS Browser 12 (of FIG. 3) can be regarded as a DMS application and is built at this level the DMS document interface provides Document and Property classes, with specialized subclasses supporting all the functionality described here (such as collections, access to WWW documents, etc.). Applications can provide a direct view of DMS documents, perhaps with a content-specific visualization, or can provide a wholly different interface, using DMS as a property-based document service back-end.

Support for Off-the-Shelf Applications

Another level of access is through translators (such as translator 13 of FIG. 3). In an existing embodiment, a server implementing the NFS protocol is used as the translator. This is a native NFS server implementation in pure Java. The translator (or DMS NFS server) provides access to the DMS document space to any NFS client; the server is used to allow existing off-the-shelf applications such as Microsoft Word to make use of DMS documents; on PC's, DMS simply looks like another disk to these applications, while on UNIX machines, DMS A looks like part of the standard network filesystem.

Critically, though, what is achieved through this translator is that DMS A is directly in the content and property read/write path for existing or off-the-shelf applications. The alternative approach would be to attempt to post-process files written to a traditional filesystem by applications, such as Word, that could not be changed to accommodate DMS A. By instead providing a filesystem interface directly to these applications, it makes it possible to execute relevant properties on the content and property read/write path. Furthermore, it is ensured that relevant properties (such as ones which record when the document was last used or modified) are kept up-to-date. Even though the application is written to use filesystem information, the DMS database remains up to date, because DMS A is the filesystem.

As part of its interface to the DMS database layer, NFS provides access to the query mechanism. Appropriately formatted directory names are interpreted as queries, which appear to "contain" the documents returned by the query. Although DMS provides this NFS service, DMS is not a storage layer. Documents actually live in other repositories. However, using the NFS layer provides uniform access to a variety of other repositories (so that documents available over the Web appear in the same space as documents in a networked file system). The combination of this uniformity along with the ability to update document properties by being in the read and write path makes the NFS service a valuable component for the desired level of integration with familiar applications. It is to be appreciated that while a server implementing NFS protocol is discussed other servers could also be used.

Figure 4:
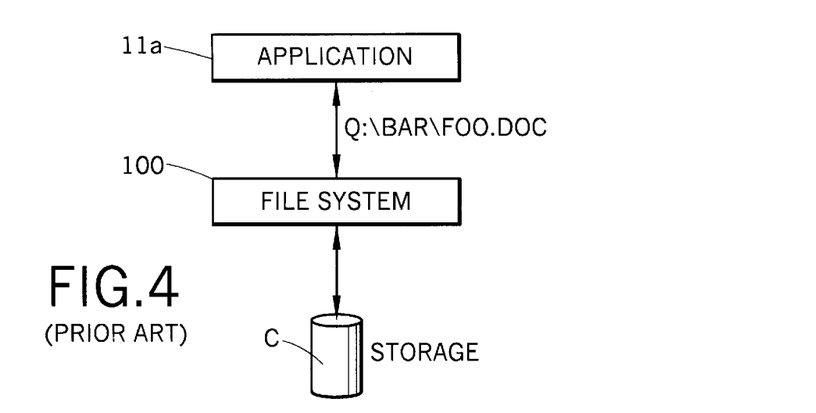
FIG. 4 illustrates a prior art system for accessing a document using a path name through a hierarchial file system.

With reference to FIG. 4, a prior art system for retrieving a document is shown. Application 11a wishes to access a document named "FOO.DOC". The application issues a request to a file system 100 where the request is in the form of a path and file name, for example, "Q:\BAR\FOO.DOC." The file system 100 converts the requested path and file name into a raw device address and command in order to retrieve the document from external storage C. The file system 100 then returns "FOO.DOC" to the application 11a for processing. Typically, application 11a will store supporting files and auxiliary data generated during the processing in the same directory of the main document "FOO.DOC" based on its path. Furthermore, upon subsequent processing of "FOO.DOC", the application 11a assumes that the supporting files will be found in the same directory. Errors may result if the supporting files are not found in the assumed directory. This causes potential problems when application 11a communicates to the DMS of the present invention, since documents are not stored according to hierarchical path names.

Clustering Related Files

Figure 5:
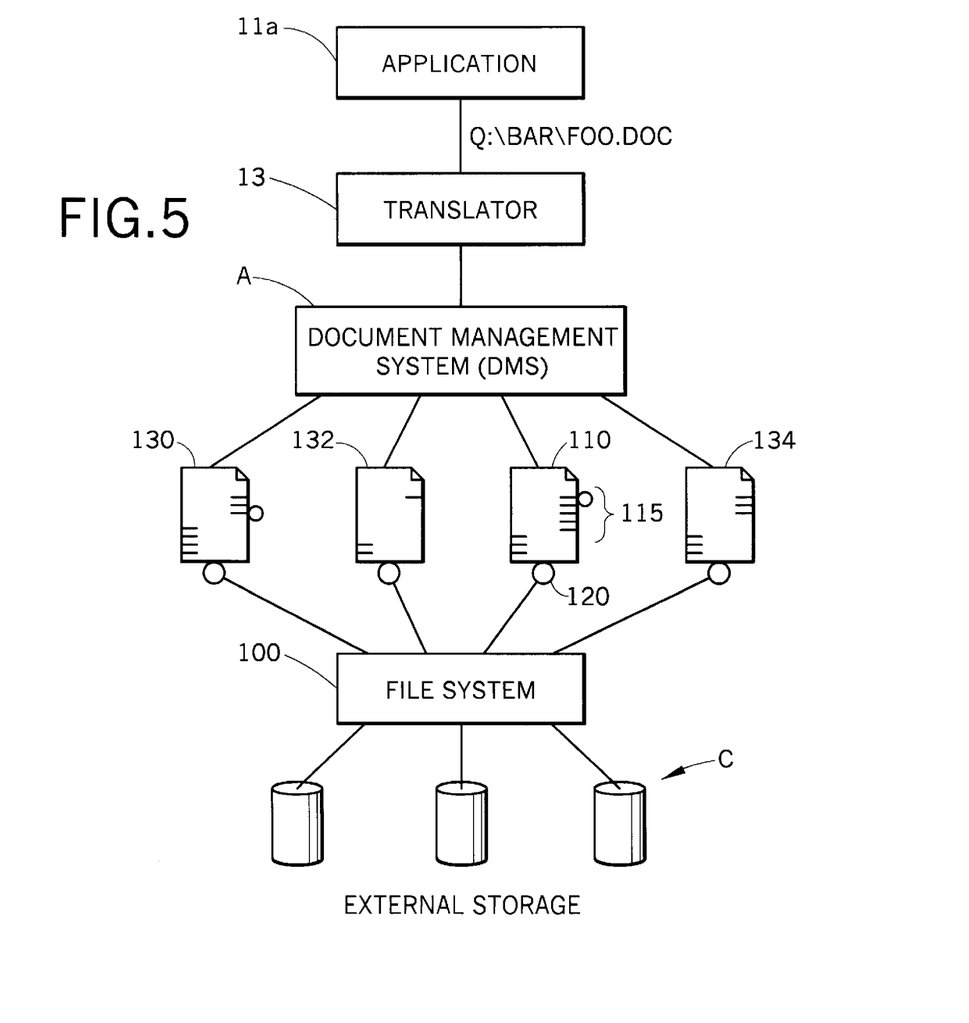
FIG. 5 illustrates translation of a hierarchial path name to the document management system protocol in accordance with the present invention.

FIG. 5 illustrates a system of the present invention which provides a solution to the foregoing problems. In order for application 11a to communicate with the present invention DMS, the translator 13 is disposed therebetween, similarly shown in FIG. 3. The translator 13 converts the requests and commands from application 11a into an appropriate DMS protocol and, if necessary, provides additional commands in order to obtain the requested result.

Suppose there is a document "FOO.DOC" 110 and suppose it is contained in collection BAR. In this example, "FOO.DOC" is given a document ID of #123. If the user selects this file for editing, the DMS issues the path "Q:\#123\BAR\FOO.DOC". The tag in this case is #123 which refers to the document "FOO.DOC". "FOO.DOC" is a DMS document which can store static and active properties 115, and includes a bit provider 120 which communicates to the non-DMS aware file system 100 to store and retrieve the content of the document from external storage C.

When application 11a processes "FOO.DOC", supporting files and auxiliary data files 130, 132, 134 are generated. Application 11a will store these files in the same directory as the main document "FOO.DOC", in this case at Q:\#123\BAR\. To the application, the tag #123 looks like an ordinary sub-directory. Translator 13 notices and extracts the tag #123 in the path name. After creating the support document, the translator will attach a static property, for example "In support of Document #123", signifying that this is a support file for "FOO.DOC". The content of the supporting files are then stored in external storage C. By having a common unique static property, the DMS can easily identify and locate all files related to "FOO.DOC" regardless of where they actually reside on external storage C.

Suppose the user finds the same document "FOO.DOC", this time in a different location BLATZ. The DMS will issue the path "Q:\#123\BLATZ\FOO.DOC" for applications to access the document. When an application tries to access a supporting file "FOO.BAK", it will access it at "Q:\#123\BLATZ\FOO.BAK". On a read from a path having a tag <#x> in it, translator 13 will extract the tag <#x> and construct a dynamic collection of all files having the static property "In support of Document <#x>". The translator then looks for file "FOO.BAK" in this collection and performs the access on this document. Note that in this case we saved a file in "Q:\#123\BAR\FOO.BAK" and then later accessed the same file through the pathname "Q:\#123\BLATZ\FOO.BAK". Knowing the tag, a single query returns all the related files. Therefore, documents that are grouped together are not limited to being stored in the same directory. Rather, they are grouped based on a common property and can actually be stored at any location. Once the tag is extracted, the particular subdirectories in the path are ignored because the files are found based on the tag.

By grouping related files using the path tag of the present invention, non-DMS aware applications are assisted in locating and retrieving related and necessary files regardless of their actual location. Furthermore, supporting files which are generated for a document are not inadvertently stored in incorrect directories or document collections, since they are managed according to the path tag property assigned to them.

By clustering related files using a tag, the DMS generates a dynamic collection of documents. By using path tagging to represent dynamic collections, the present invention solves the problem of both supporting non-DMS aware applications while allowing documents to reside in multiple collections without having the collections be cluttered with supporting files.

By way of another example, the present path tagging technique may be used to support document versions. For example, tagging can be used to allow access to document repositories which have no notion of versions by using a translator and interface to the file system which supports versioning. By using a path tag to represent a version number, for example, #V1.13, a single path to a file can be augmented to allow non-DMS aware applications to access arbitrary versions of the document (e.g., C:\FOO\BAR\#V1.13\BAZ.DOC).

Figure 6:
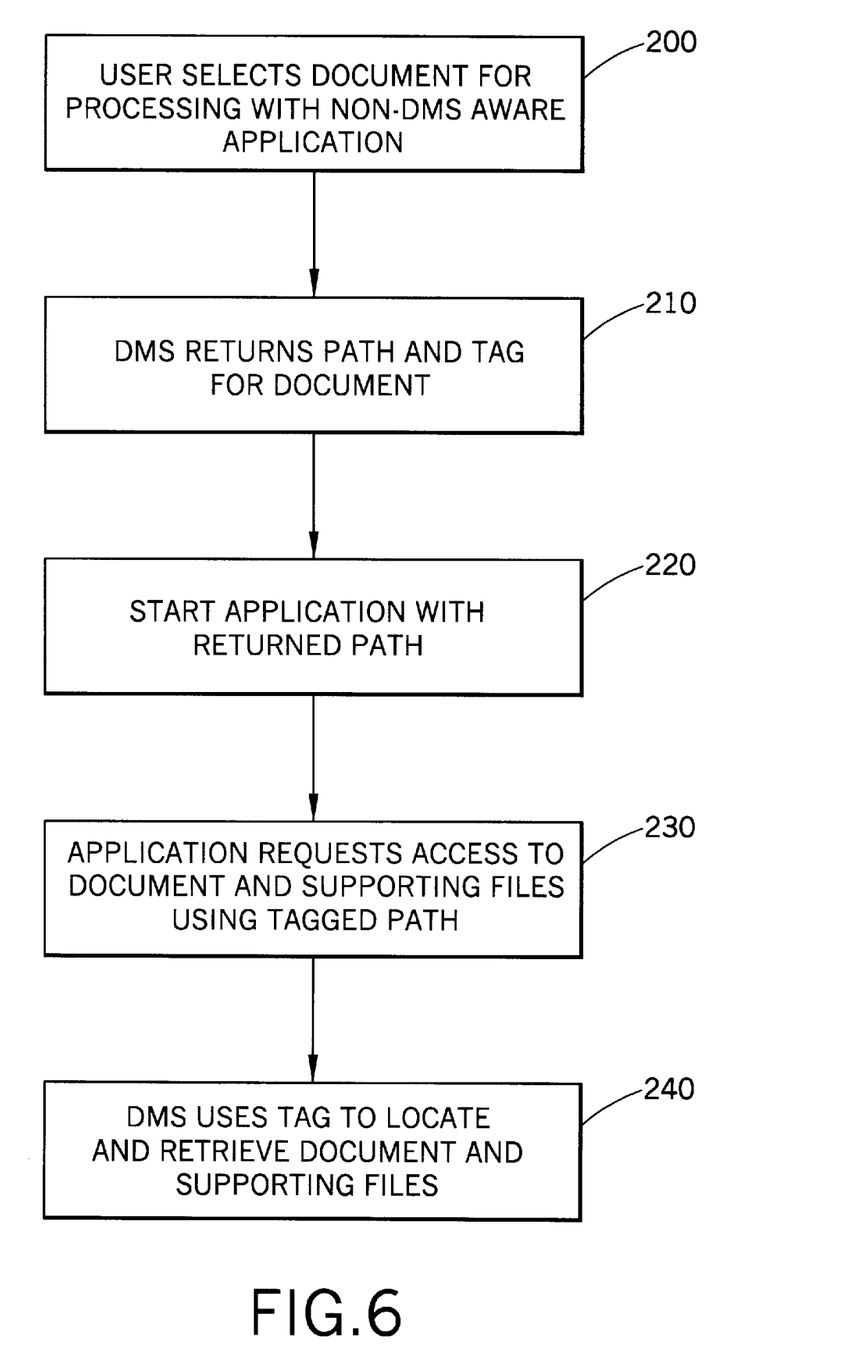
FIG. 6 illustrates a flow diagram of retrieving related files in accordance with the present invention.

With reference to FIG. 6, exemplary processing of the present invention is shown. A user locates a document, for example by way of a query to the DMS which returns a collection of documents, and selects 200 the document which is to be processed by a non-DMS aware application. In this case, the document has already been tagged with a unique ID in its path. The DMS returns 210 the path and tag of the document to the application. The application is then started 220 with the returned path. The application requests access 230 to the document and its supporting files using the tagged path. The DMS, based on the tag, locates and retrieves 240 the document and supporting files regardless of their actual location. In this manner, the application has access to all related files thus avoiding any potential errors in processing caused by a failure to locate necessary files.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof

Having thus described the invention, we now claim:

1. In a system where an application stores and retrieves a document based on a path and filename, and stores and retrieves supporting files of the document based on the path, a method of generating a dynamic collection of related documents including the document and the supporting files comprising the steps of:
    inserting a tag in the path of the document, the tag being a unique identifier of the document;
    generating a supporting file for the document and associating the tag to the supporting file such that the supporting file and document are identified and retrieved as a collection based on the tag.

2. The method as set forth in claim 1 further including, upon subsequent processing of the document, extracting the tag from the path of the document and locating the supporting file based on the tag.

3. The method as set forth in claim 1 wherein the document and the supporting file are stored in different locations and a single query based on the tag locates and retrieves both the document and supporting file.

4. The method as set forth in claim 1 wherein the tag is associated to the supporting file by inserting the tag in a path of the supporting file.

5. The method as set forth in claim 4 wherein the path of the supporting file is different from the path of the document except for the tag.

6. A method of launching an application on a document, the method comprising the steps of:
    selecting the document for processing with the application, the document including a path and a path tag which identifies the document;
    extracting the path and path tag;
    launching the application on the document based on the extracted path; and
    locating and retrieving, based on the path tag while discarding the path, the document and supporting files for the document, the supporting files including the path tag which represents a relationship to the document.

7. The method as set forth in claim 6 wherein the path tag is a unique file-ID inserted into the path.

8. The method as set forth in claim 6 wherein the path of the document is different than a path of the supporting files.

9. The method as set forth in claim 6 wherein the locating includes generating a query which requests files having the path tag associated thereto.

10. A method of launching an application on a document, the method comprising the steps of:
    selecting the document for processing with the application, the document including a path and a path tag which identifies the document;
    extracting the path and path tag;
    launching the application on the document based on the extracted path; and
    locating and retrieving, based on the path tag while discarding the path, the document and supporting files for the document, the supporting files including the path tag which represents a relationship to the document.

11. The method as set forth in claim 10 wherein the locating includes generating a query which requests files having the path tag associated thereto.

12. The method as set forth in claim 10 wherein the path of the document is different than a path of the supporting files.

13. The method as set forth in claim 10 wherein the path tag is a unique file-ID inserted into the path.

* * * * *